(12) United States Patent
Yamada

(10) Patent No.: US 8,374,469 B2
(45) Date of Patent: Feb. 12, 2013

(54) OPTICAL WAVEGUIDE

(75) Inventor: Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 424 days.

(21) Appl. No.: 12/278,907

(22) PCT Filed: Jan. 31, 2007

(86) PCT No.: PCT/JP2007/051605
§ 371 (c)(1),
(2), (4) Date: Aug. 8, 2008

(87) PCT Pub. No.: WO2007/091465
PCT Pub. Date: Aug. 16, 2007

(65) Prior Publication Data
US 2010/0232742 A1  Sep. 16, 2010

(30) Foreign Application Priority Data
Feb. 9, 2006 (JP) .................................. 2006-032383

(51) Int. Cl.
*G02B 6/12* (2006.01)
*G02B 6/26* (2006.01)
*G02B 6/10* (2006.01)
*G02F 1/01* (2006.01)

(52) U.S. Cl. ................ 385/14; 385/1; 385/40; 385/129; 385/132

(58) Field of Classification Search .................. 385/1–5, 385/14, 39, 40, 122, 129–131
See application file for complete search history.

(56) References Cited

U.S. PATENT DOCUMENTS 5,566,257 A * 10/1996 Jaeger et al. ................... 385/2
5,757,986 A * 5/1998 Crampton et al. ............. 385/2
6,002,816 A * 12/1999 Penninckx et al. ............ 385/3

(Continued)

FOREIGN PATENT DOCUMENTS

EP  0334209 A2  9/1989
JP  09-211240 A  8/1997

(Continued)

OTHER PUBLICATIONS

High-Speed Phenomena in Photonic Materials and Optical Bistability Mar. 12-14, 1990, The Hague, Netherlands, vol. 1280, Mar. 12, 1990-Mar. 14, 1990 pp. 300-307, XP002579792 Proceedings of the SPIE—The International Society for Optical Engineering USA ISSN: 0277-786X p. 300-p. 301; figure 1.

(Continued)

*Primary Examiner* — Brian Healy
*Assistant Examiner* — Hung Lam
(74) *Attorney, Agent, or Firm* — Sughrue Mion, PLLC

(57) ABSTRACT

A waveguide structure includes core 1 formed of a semiconductor such as Si, two external regions 2 which are not optically connected to the core but arranged at a certain distance from the core and bridges 3 which electrically connect the external regions to the core. Light propagating in the waveguide core is strongly confined in the waveguide core and optically disconnected from (i.e. not coupled with) the external regions, so that light can propagate in the waveguide without being affected by the existence of the external regions. Furthermore, the waveguide core is electrically connected to the external regions through the bridges, so that a voltage can be applied and a current can be caused to flow to the core from the external regions.

7 Claims, 7 Drawing Sheets

1: WAVEGUIDE CORE
2: EXTERNAL REGION
3: BRIDGE
4: SUBSTRATE
L: LIGHT

U.S. PATENT DOCUMENTS

2004/0052491 A1    3/2004    Otake et al.
2007/0058896 A1*   3/2007    Toyoda et al. .................... 385/3

FOREIGN PATENT DOCUMENTS

| | | |
|---|---|---|
| JP | 2000-284136 A | 10/2000 |
| JP | 2002-303836 A | 10/2002 |
| JP | 2004-077767 A | 3/2004 |
| JP | 2004-102160 A | 4/2004 |
| JP | 2004-109412 A | 4/2004 |
| JP | 2004-170836 A | 6/2004 |
| JP | 2004-325914 A | 11/2004 |
| JP | 2005-045162 A | 2/2005 |
| JP | 2005-64471 A | 3/2005 |
| JP | 2005-274840 A | 10/2005 |
| JP | 2006-30733 A | 2/2006 |
| WO | 2004/063797 A1 | 7/2004 |

OTHER PUBLICATIONS

Mueller G et al: "Low-Trheshold INGAASP Ridge—Waveguide Laser Fabricated by a New Contacting System" Electronics Letters, IEE Stevenage, GB, vol. 22, No. 10, May 8, 1986, pp. 526-528, XP000709993 ISSN: 0013-5194.

Office Action, Issued Jan. 31, 2012, by the Japanese Patent Office in counterpart Japanese Application No. 2007-557799.

* cited by examiner

1: WAVEGUIDE CORE
2: EXTERNAL REGION
3: BRIDGE
L: LIGHT

1: WAVEGUIDE CORE
2: EXTERNAL REGION
3: BRIDGE
4: SUBSTRATE
L: LIGHT

11: Si CORE
12: SiO2 CLAD
13: SUBSTRATE

1: WAVEGUIDE CORE
2: EXTERNAL REGION
3: BRIDGE
4: SUBSTRATE
5: SLIT HOLE

1: WAVEGUIDE CORE
2: EXTERNAL REGION
3: BRIDGE
4: SUBSTRATE
5: SLIT HOLE

5: SLIT HOLE
A: REGION WHERE P-TYPE IMPURITY IS DOPED WITH HIGH CONCENTRATION
B: REGION WHERE N-TYPE IMPURITY IS DOPED WITH HIGH CONCENTRATION 701, 703: P-TYPE SEMICONDUCTOR
702: N-TYPE SEMICONDUCTOR
704: ELECTRODE
705: Si CORE
706: LOWER CLAD
707: UPPER CLAD

OPTICAL WAVEGUIDE

TECHNICAL FIELD

The present invention relates to a functional optical waveguide, and in particular, to an optical waveguide device whose characteristics such as the propagation loss of light wave, the propagation constant of light wave, group velocity and dispersion can be electrically controlled at a high speed by applying an external voltage and injecting a current thereto.

BACKGROUND ART

In recent years, various optical devices such as an optical switch, an optical multiplexer/demultiplexer and an optical modulator have been experimentally produced using an optical waveguide with a core of a semiconductor such as Si and Ge and a compound semiconductor such as AlGaAs and InGaAsP. An optical waveguide device using Si for a core can be significantly downsized compared with a conventional optical waveguide device using silica for a core, and furthermore, the characteristics thereof can be electrically controlled in an active manner by injecting a current and applying a voltage to the core itself because the core is formed of a semiconductor. On the other hand, in general, a conventional optical waveguide using silica for a core is thermally controlled. This is because silica is an insulator, so that a current cannot be caused to flow therein. As a method of controlling the characteristics of an optical waveguide such as the propagation loss of light wave, the propagation constant of light wave, group velocity and dispersion, there have been known methods of using any of a thermo-optic (T-O) effect, an acousto-optic (A-O) effect, a magneto-optic (M-O) effect, an electro-optic (E-O) effect (also referred to as "Pockels effect") and a carrier plasma effect. Among others, the method of using an electro-optic (E-O) effect by which a voltage is applied to vary a refractive index and the method of controlling a refractive index using a carrier plasma effect produced by injecting a current are used for controlling the characteristics at a high speed because the methods can provide quick response in 1 nsec or less.

Incidentally, as an optical waveguide using Si for a core, there exist a Si rib waveguide and an Si wire waveguide. The Si rib waveguide provides an oxide film and a control electrode thereon to form an MOS structure, thereby applying voltage to realize the control of a refractive index of the waveguide. Recently, an Si high-speed optical modulator using the MOS structure including the Si rib waveguide has been realized. However, the Si rib waveguide essentially loosely confines light into a core, so that the Si rib waveguide does not adapt to a sharp curvature with a radius of curvature of several μm. For this reason, the waveguide in the Si rib waveguide needs to be curved gently, which inevitably increases the size of devices such as an optical switch and an optical modulator using the waveguide. On the other hand, the Si wire waveguide strongly confines light into a core and can adapt to a sharp curvature with a radius of curvature of several μm, so that the Si wire waveguide draws attention as a technique by which an optical device can be downsized.

However, the cross section of a core of the Si wire optical waveguide is in the order of sub-micron square and the periphery of the core is normally covered with an insulator such as silica and air, so that it is difficult to uniformly and effectively inject a current into and apply a voltage to the core.

Patent document 1 (Japanese Patent Laid-Open No. 2004-170836) describes a variable optical attenuator in which any optional light attenuation can be provided by an electrical control using a waveguide having a Si wire as a core which is covered with a clad, such as of an insulator. An upper clad layer, which is made of silicon (for example, polysilicon) to which oxygen or nitrogen is added, is formed to cover the upper portion and both sides of the Si core and forms a waveguide along with the core. The waveguide includes a p-type carrier supply section in which a p-type impurity is introduced into a part of the side of the upper clad and an n-type carrier supply section in which an n-type impurity is introduced into the opposing side thereof. Since oxygen or nitrogen is added to the regions where the p-type and n-type carrier supply sections are formed, the periphery of the core is rendered low in refractive index, thereby light is confined in the core.

On the other hand, the following has been known. In a photonic crystal with a periodic distribution of refractive index in the order of the wavelength of light, there exists a so-called photonic band gap in which the presence of light in a wavelength region corresponding to the period is prohibited, and the introduction of an artificial defect disturbing a periodic structure into the crystal enables light to exist in the photonic band gap and various lights to be controlled.

An optical switch with such a photonic crystal structure is described in Patent Document 2 (Japanese Patent Laid-Open No. 2002-303836). In the description in paragraph numbers 0054 to 0060 and FIG. 12 of Patent Document 2, there disclose: a triangular lattice photonic crystal structure and a line-defect waveguide are formed in a non-doped Si layer of an SOI wafer; impurities are injected into both sides of the line-defect waveguide to form electrodes; the photonic band gap structure of the photonic crystal in the part of the line-defect waveguide through which light propagates is varied by which a current can be injected or a reverse bias can be applied; and the waveguide mode of the line defect waveguide existing in the photonic band gap becomes a cut-off state (or, in a state in which light cannot propagate), which disables light from propagating through the line defect waveguide and functions as an optical switch.

Patent document 1: Japanese Patent Laid-Open No. 2004-170836

Patent Document 2: Japanese Patent Laid-Open No. 2002-303836 (paragraph numbers 0054 to 0060 and FIG. 12)

DISCLOSURE OF THE INVENTION

Problems to be Solved by the Invention

In Patent document 1, carriers are injected to the waveguide core through the p- and the n-type carrier supply sections to vary the propagation loss of the waveguide. However, since the p- and the n-type carrier supply sections are brought into contact with the core, an appreciable amount of impurities is doped into the core portion where doping is not desired, probably causing light propagating through the waveguide to suffer a large propagation loss.

The present invention has for its object to provide a structure for realizing the electrical control of characteristics and a method of producing the same in such an optical waveguide using a semiconductor for a core.

Means for Dissolving the Problems

The present inventor has intensively investigated to solve the above problems and reached the present invention. That is to say, the present invention relates to an optical waveguide using a semiconductor for a core includes: two external regions in the immediate vicinity of the core; and a structure in which the core is electrically connected to the external regions by a bridge structure to enable a current to be injected into and a voltage to be applied to the core through the bridge structure from the external regions; wherein the waveguide core is optically separated from the external regions spaced apart by the bridge structure.

The phrase "optically separated" herein means that light is confined in the optical waveguide core and the tail of electromagnetic filed distribution of light guided along the optical waveguide core less probably extends to the external regions, as a result, the influence of light on the external regions can be neglected. In other words, light propagating along the optical waveguide core is independent of whether the external region is present or not.

Effect of The Invention

As an effect of the present invention, the use of the electrically controllable optical waveguide realizes a high speed responsive optical switch and optical modulator.

DESCRIPTION OF SYMBOLS

Figure 1:
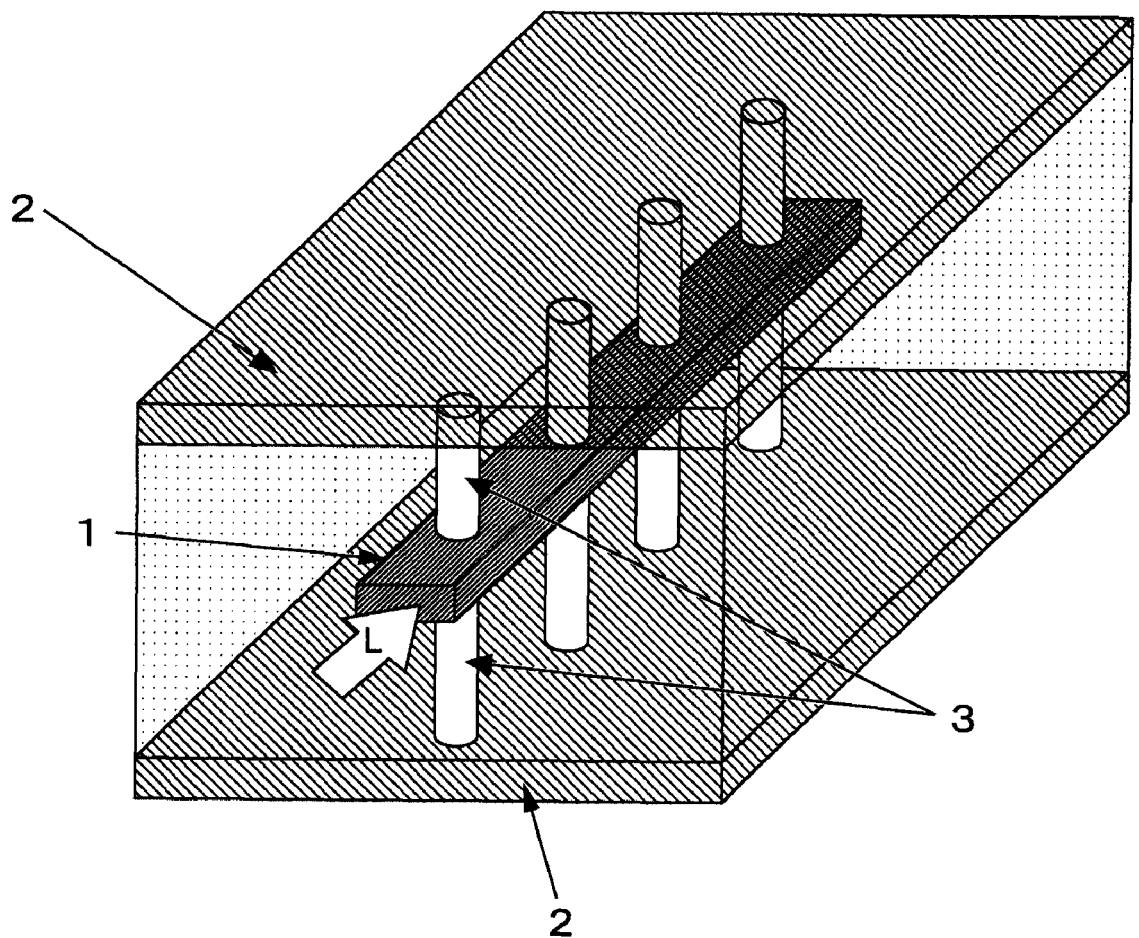
FIG. 1 is one conceptual diagram of an optical waveguide according to the present invention.

1: Waveguide core
2: External region
3: Bridge
4: Substrate
5: Slit hole
701 and 703: p-type semiconductor
702: n-type semiconductor
704: Electrode
705: Si core
706: Lower clad
707: Upper clad

BEST MODE FOR CARRYING OUT THE INVENTION

Figure 2:
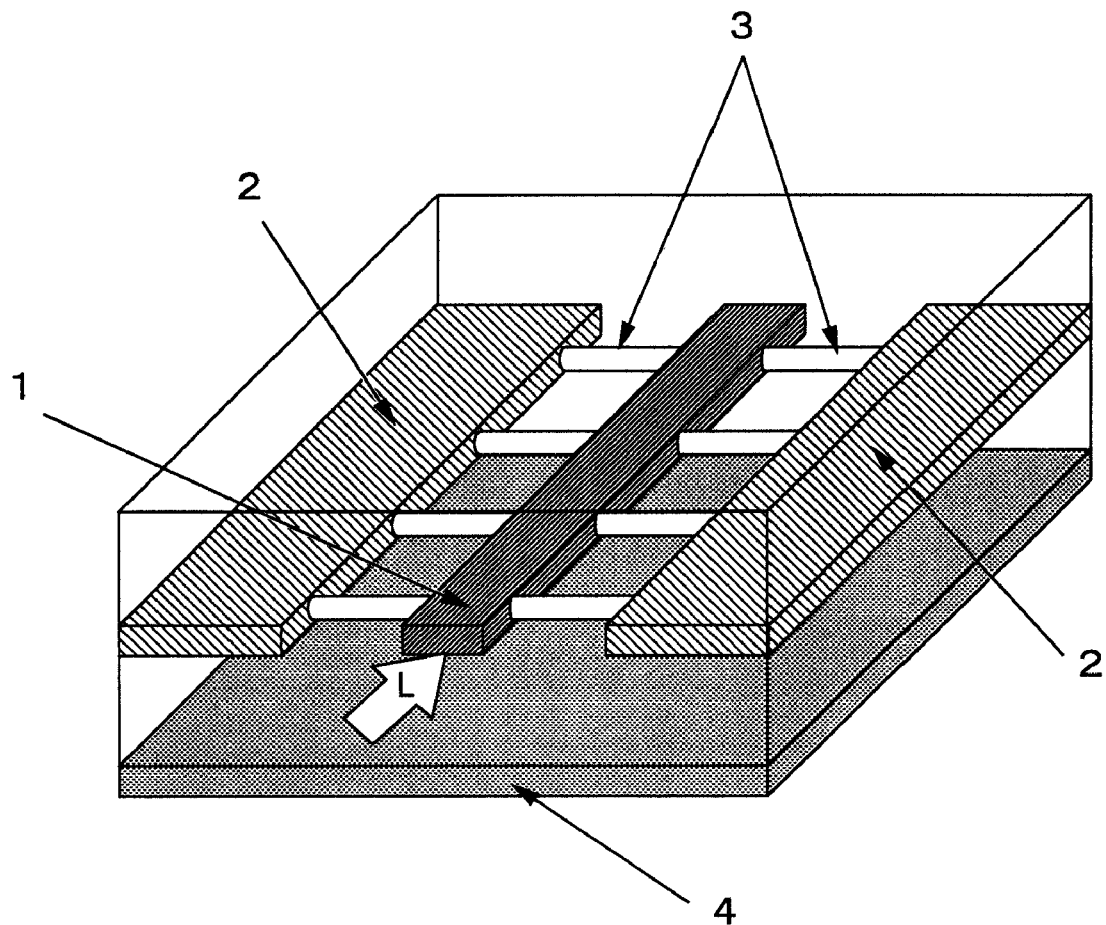
FIG. 2 is another conceptual diagram of an optical waveguide according to the present invention.

FIGS. 1 and 2 are conceptual diagrams illustrating the structure of the waveguide according to the present invention.

The waveguide mainly includes core 1 of Si, two or more external regions 2 which are not optically coupled with (i.e. separated from) core 1 but arranged at a certain distance from core 1 and bridge 3 which electrically connects external regions 2 to core 1. Since light propagating in waveguide core 1 is optically disconnected from (i.e. not coupled with) external regions 2 by bridge 3, the light propagating in core 1 can propagate in waveguide core 1 without being affected by the existence of external regions 2 while strongly confined in waveguide core 1. Furthermore, waveguide core 1 is electrically connected to external regions 2 through bridge 3, so that a voltage can be applied and a current can be caused to flow to core 1 from external regions 2. For this reason, bridges 3 are preferably arranged at as narrow intervals as possible and at equal intervals so that a voltage can be uniformly applied and a current can be caused to uniformly flow through waveguide core 1. Although not illustrated, electrodes (i.e., a positive and a negative electrode) are provided on external regions 2 to apply a voltage and cause a current to flow to core 1. Impurities are preferably doped into external regions 2, bridges 3 and waveguide core 1 with an appropriate amount to reduce the electric resistance of the portions within measure in order to apply a voltage and cause a current to flow to core 1. Doping excessive impurities decreases an electric resistance, this is desirable only to cause a current to flow, however, light propagating through the portions suffers from a significant light absorption loss. For this reason, it is desirable to prevent intentionally doping of impurities into the portion of the core through which light propagates or to dope impurities at a low concentration even if they are doped thereinto. Therefore, impurities are desirably doped into the core with as low concentration as possible, doped into the bridge portion with a medium concentration and doped into the external region with a high concentration. Thereby, the electric resistance of each portion is gradually reduced in the following order: core>bridge>external region. However, the magnitude of an optical absorption loss is gradually increased in the following order: core<bridge<external region. Both p- and n-type impurities may be used for doping if a current is merely injected or a voltage is merely applied. In other words, only the p-type impurity may be doped to the all, or conversely only the n-type impurity may be doped to the all. If the carrier density of the core portion is controlled by the direction of voltage (polarity) to be applied, it is desirable that the p-type impurity is doped into one of two external regions and the n-type impurity is doped into the other of them. In this case, the impurities are desirably doped so as to form a pn junction interface right at the core portion. Thereby, the carrier density in the core can be effectively controlled by the polarity of applied voltage (forward or reverse bias). Thus, modulating the carrier density in the core varies the refractive index in the core region by a carrier plasma effect to enable the control of a propagation constant (phase) of light propagating in the core.

As regards the arrangement of external regions 2 and bridges 3, as illustrated in FIG. 1, two external regions 2 are arranged perpendicularly to a substrate (not shown). External regions 2 may be connected with core 1 through bridges 3 perpendicularly to the substrate. Alternatively, as illustrated in FIG. 2, two external regions 2 are arranged in parallel to substrate 4. External regions 2 may be connected with core 1 through bridges 3 in parallel to substrate 4. Still alternatively, although not illustrated, the external regions do not always oppose the waveguide core, but they may be perpendicular to or make any angle with the waveguide core. The choice of which configuration is selected is dependent on the structure of a device realized by using the waveguide. In the following, an exemplary embodiment of the present invention is described in detail with reference to the drawings. Although an Si wire waveguide using a Si semiconductor for a core is exemplified herein, the present invention is not limited to the exemplification, but is applicable to an optical waveguide using, for a core, other semiconductors such as Ge and the like or a compound semiconductor such as AlGaAs and InGaAsP.

Figure 3:
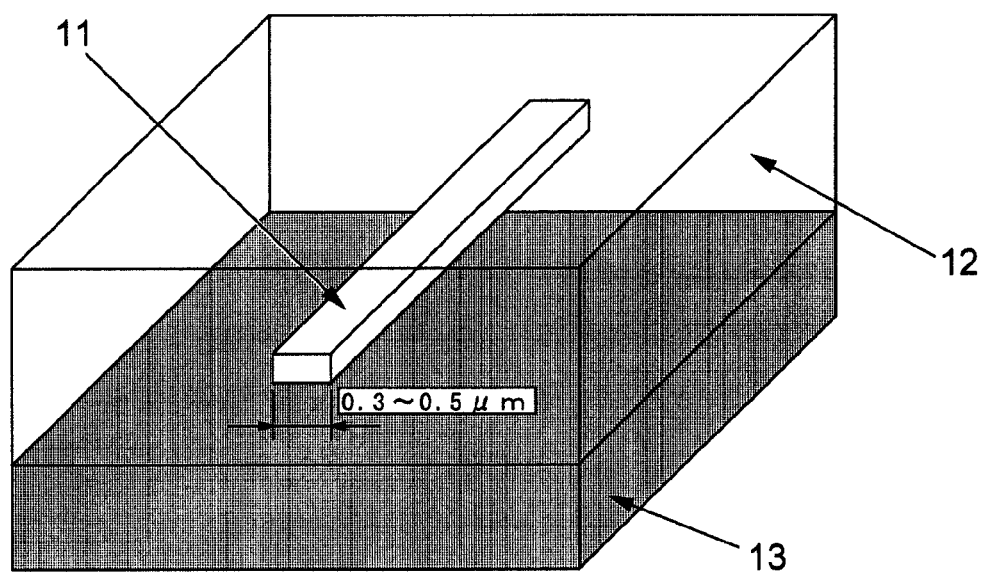
FIG. 3 is a structural diagram of an ordinary Si wire optical waveguide.

The Si wire waveguide is formed of a core of Si and a clad, for covering the core, formed of a material such as silica, polymer or air of which refractive index is substantially smaller than that of Si (about 3.5) (the refractive index is desirably 2 or less to realize a radius of curvature of 10 μm or less) and which is electrically insulated. The cross section of the Si wire waveguide core is preferably about 0.3 μm to 0.5 μm in width and about 0.3 μm to 0.2 μm in thickness so that the Si wire waveguide functions as a single-mode waveguide. The cross section of the core is greater than the above size, the Si wire waveguide functions as a multimode waveguide. FIG. 3 illustrates the structure of an ordinary Si wire waveguide. In FIG. 3, a 0.3 μm to 0.5 μm wide Si core 11 is formed in $SiO_2$ clad 12 on Si substrate 13, which forms a single-mode waveguide.

Figure 4:
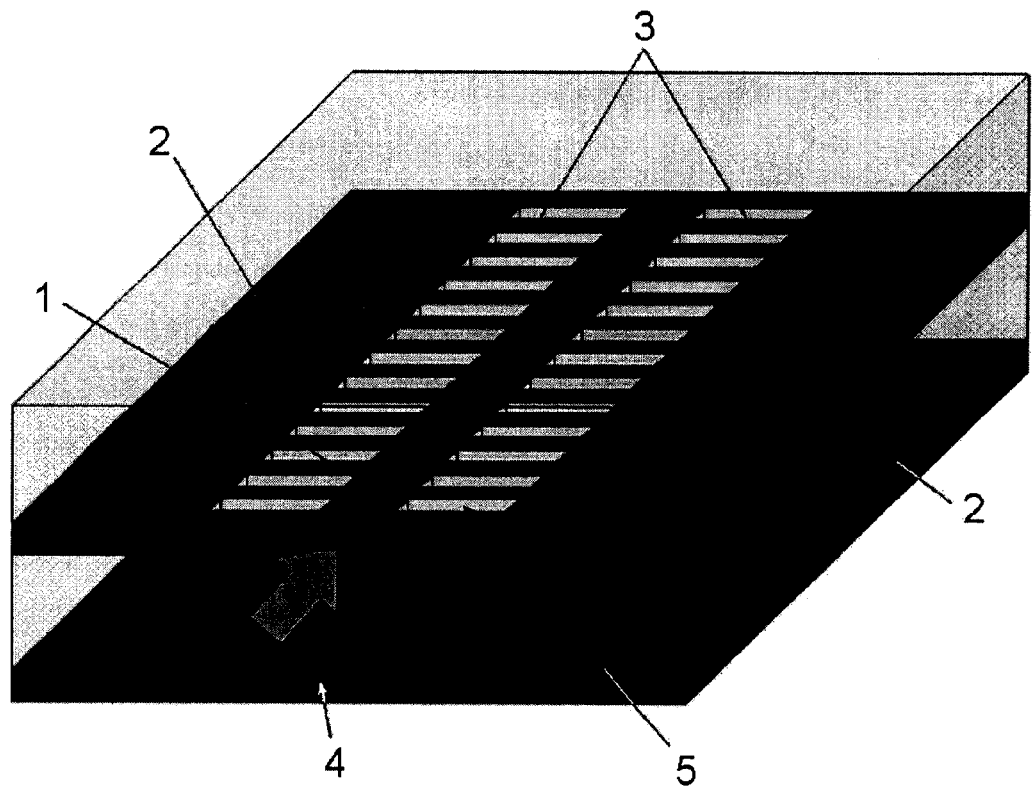
FIG. 4 is a schematic perspective view illustrating a first exemplary embodiment according to the present invention.
Figure 6A:
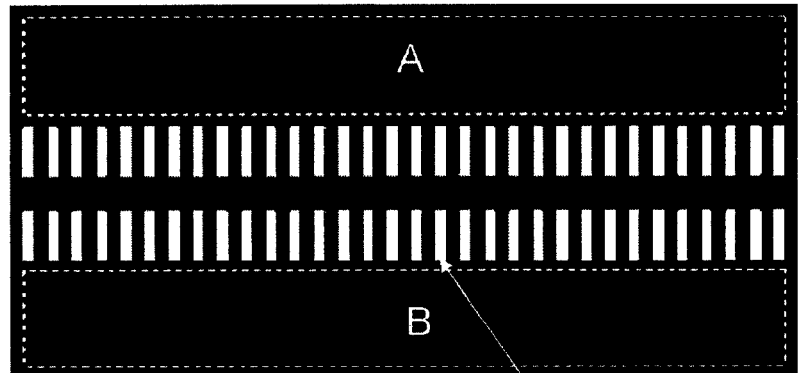
FIG. 6(a) is a top plan view supplementing the first exemplary embodiment according to the present invention.

In view of production, there is desirable a structure in which a current is injected from the side of the Si core as illustrated in FIG. 4 to evenly and effectively inject a current into the Si core with such a very small cross section. In the Si wire waveguide of the present invention, core 1 is electrically connected to external regions 2 through bridge structure 3 so that a current can be injected or a voltage can be applied from the side of waveguide core 1. External regions 2 electrically connected to core 1 through bridge structure 3 include electrodes (not shown) for causing a current to flow and applying a voltage to core 1. As illustrated in FIG. 4, although the structure of bridge 3 in which rectangular slit-shaped holes 5 are formed at regular intervals is illustrated, the shape of the hole is not limited to a rectangle, but may be circle, elliptic or polygon such as triangle. In brief, there may be a structure in which waveguide core 1 is optically separated from external regions 2 so that light is strongly confined in waveguide core 1 and a current can be injected into waveguide core 1 through bridge 3 from external regions 2 in terms of electricity. Thus, in order to cause a current to flow or to apply a voltage to the waveguide core, a modest amount of impurities is desirably doped into core 1, bridge 3 and external regions 2 so that they have a proper electric resistance. In this case, it is desirable to dope impurities so that the concentration of the impurities is increased in the following order: core<bridge<external region. More specifically, it is desirable to dope impurities so that the carrier density in the core region is $1 \times 10^{17}$ or less, the bridge region is about $1 \times 10^{18}$ and the external region is $1 \times 10^{18}$ or more. As illustrated in FIG. 6(a), p-type impurity is doped into one of the external regions and n-type impurity is doped into the other of the external regions to form a pn junction inside or around the core region, allowing the refractive index of the core to be electrically controlled through a carrier plasma effect.

Light propagating in the waveguide core in the structure in FIG. 4 in which the slits are periodically arranged in the longitudinal direction of the waveguide detects a periodic modulation of refractive index along the propagation direction, so that Bragg reflection is produced on light with a certain specific wavelength, which makes it difficult for light to propagate (or, propagation loss increases). Assuming Λ to be the period of the periodic modulation of refractive index due to the slits, a wavelength λ at which the Bragg reflection is produced can be represented by $\lambda = 2n\Lambda/q$ (where, "n" is an equivalent refractive index of the waveguide and "q" is a natural number). For example, if Λ=300 nm and n=2, the Bragg reflection appears at wavelengths of about 1.2 μm, 600 nm and 400 nm. For this reason, these regions need to be avoided.

Figure 5:
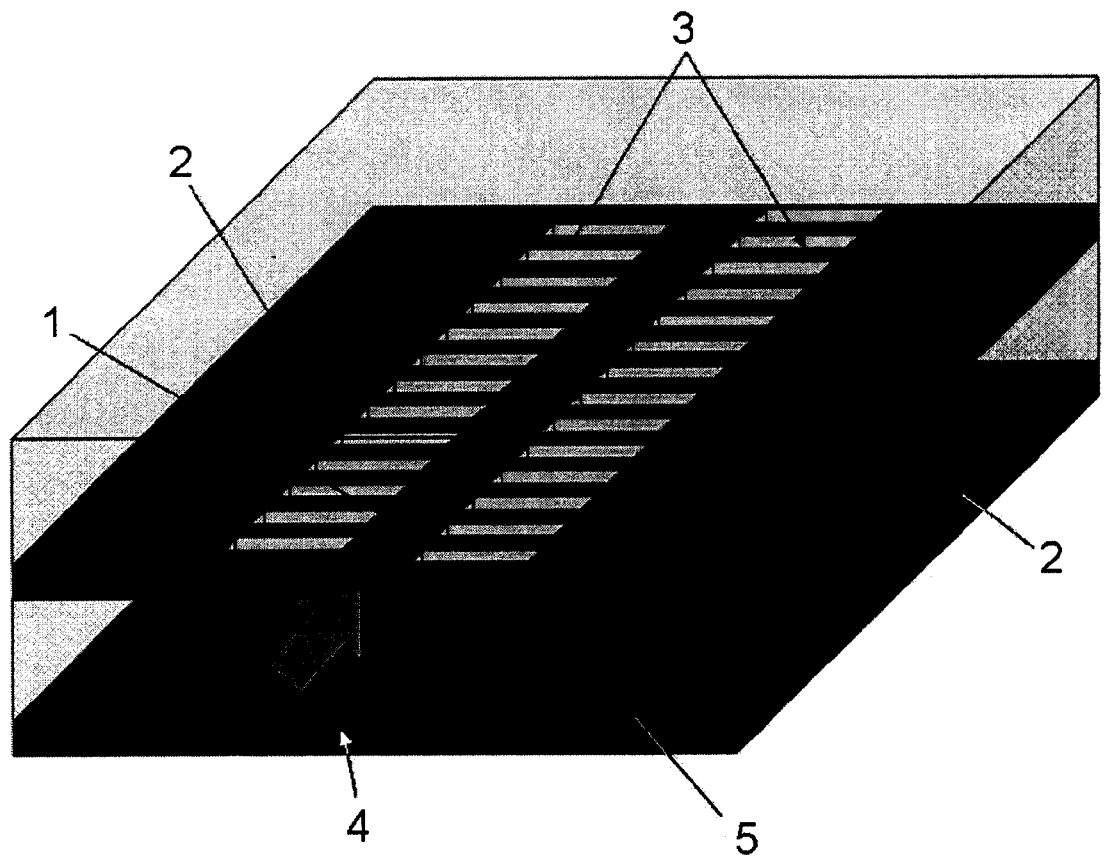
FIG. 5 is a schematic perspective view illustrating a second exemplary embodiment being an improvement of the first exemplary embodiment according to the present invention.
Figure 6B:
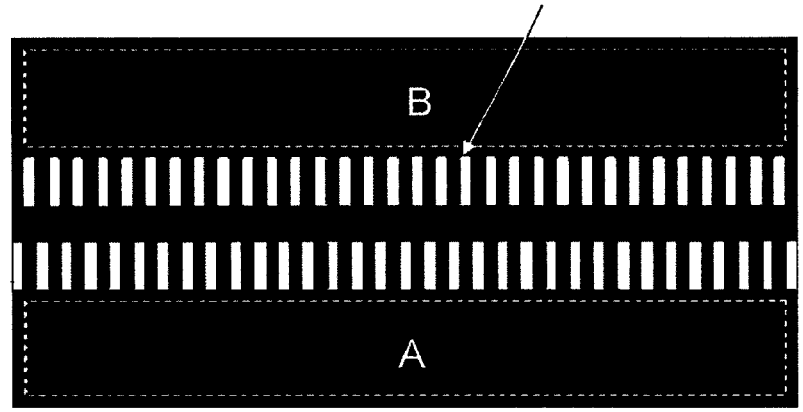
FIG. 6(b) is a top plan view supplementing the second exemplary embodiment being an improvement of the first exemplary embodiment according to the present invention.

On the other hand, in the slit structure in FIG. 5, holes 5 of the slits are shifted in position on both sides of waveguide core 1. That is to say, the periodic repetitive phases of the slits on both sides (left and right sides) of waveguide core 1 are shifted by π. In other words, in the position where the hole of the slit lies on the left side of the core, the bridge is positioned on the right side of the core. In contrast, in the position where the bridge lies on the left side of the core, the slit is positioned on the right side of the core (refer to FIG. 6(b)). Thereby, light propagating in the core does not detect the modulation of refractive index due to the regular arrangement of the slits, unlike the case (refer to FIG. 6(a)) where the positions of the slits are coincident with each other on both sides of the waveguide core in FIG. 4. For this reason, the structure is not affected by the Bragg reflection, so that it can be used for any wavelength. Furthermore, for a waveguide in which the holes of the slits are formed entirely at random without periodicity in the longitudinal direction of the waveguide, the phases on the left and the right side of the waveguide core do not need to be considered and such a structure is not affected by the Bragg reflection due to the holes of the slits. However, periodicity is required to some extent from the viewpoint of realizing uniform injection of current into the core.

Patent Document 2 uses variation in the photonic band structure of photonic crystal, while the present invention can directly vary the refractive index of the core layer by the injection of current and the application of voltage without variation in such a band structure to modulate the propagation constant of the waveguide, allowing switching.

EXAMPLES

Although the present invention is described below in detail with reference to examples, but is not limited only to these examples.

Example 1

The structure of an optical waveguide and a method of producing the optical waveguide are described below as a first example of the present invention. Firstly, an SOI substrate is prepared, an Si layer of the surface of which is approximately 200 nm to 300 nm in thickness and a buried oxide film (BOX) layer under the Si layer of which is approximately 1 μm to 3 μm in thickness. Such an SOI substrate is being marketed and easily available. Secondly, as illustrated in FIG. 4, slit-shaped holes 5 are made through the Si layer of the surface to form a waveguide core region. Such a working may be performed using an Si dry etcher such as commercially available ICP apparatus. Covering the worked surface Si layer with a silica layer having a thickness of 1 μm or more forms a channel waveguide using Si for a core. Forming such a structure enables a current to be injected into or a voltage to be applied to core 1 through bridges 3 with the slit structure from external regions 2. Waveguide core 1 is electrically connected to external regions 2 through bridges 3, while light propagating in the waveguide is confined enough in core region 1 to be hardly affected by external regions 2. In order that light is thus confined enough in core region to be hardly affected by the external regions, slits 5 may be a rectangle with a width of 200 nm and a length of 1 μm or more, for example, and may be arranged at an interval of 100 nm. The size of the slit described above is merely a target value, to be exact, an electromagnetic field distribution of the waveguide mode is calculated by an electromagnetic field analysis to minimize as much as possible a rate at which the electromagnetic field of light covers the external field.

On the other hand, impurities need to be appropriately doped into the core, bridge and external regions to cause a current to flow the core. Specifically, doping may be performed such that the carrier density in the core region is $1 \times 10^{17}$ or less, the carrier density in the bridge region is approximately $1 \times 10^{18}$ and the carrier density in the external regions is $1 \times 10^{18}$ or more. As illustrated in FIG. 6(a), p-type impurity is doped into one of the external regions and n-type impurity is doped into the other of the external regions to form a pn junction interface in or around the core region. Such p- and n-type impurity doping regions are desirably formed before an SOI wafer is worked. That is to say, it is the simplest method that the p- and n-type regions are selectively formed first by ion implantation or impurity diffusion into the SIO wafer, thereafter, the impurities are activated by heat treatment and a bridge structure is formed in line with the formed p- and n-type regions by etching. Furthermore, an electrode (ohmic contact) is formed in the external regions to cause a current to flow and apply a voltage to the core.

Example 2

An exemplary embodiment of an optical waveguide structure as a second example of the present invention is described below. As described above, the waveguide structure illustrated in the first example has a wavelength band at which the Bragg reflection takes place, so that such a wavelength band needs to be avoided. On the other hand, as illustrated in FIG. 5, a structure in which the holes of the slits are shifted by it in position on both sides of waveguide core 1 does not cause the Bragg reflection to be worked over a wide wavelength range. The waveguide illustrated in FIG. 5 is the same in structure and production method as the waveguide in the first example, excluding that the positions of the holes are shifted.

Example 3

Figures 7A, 7B:
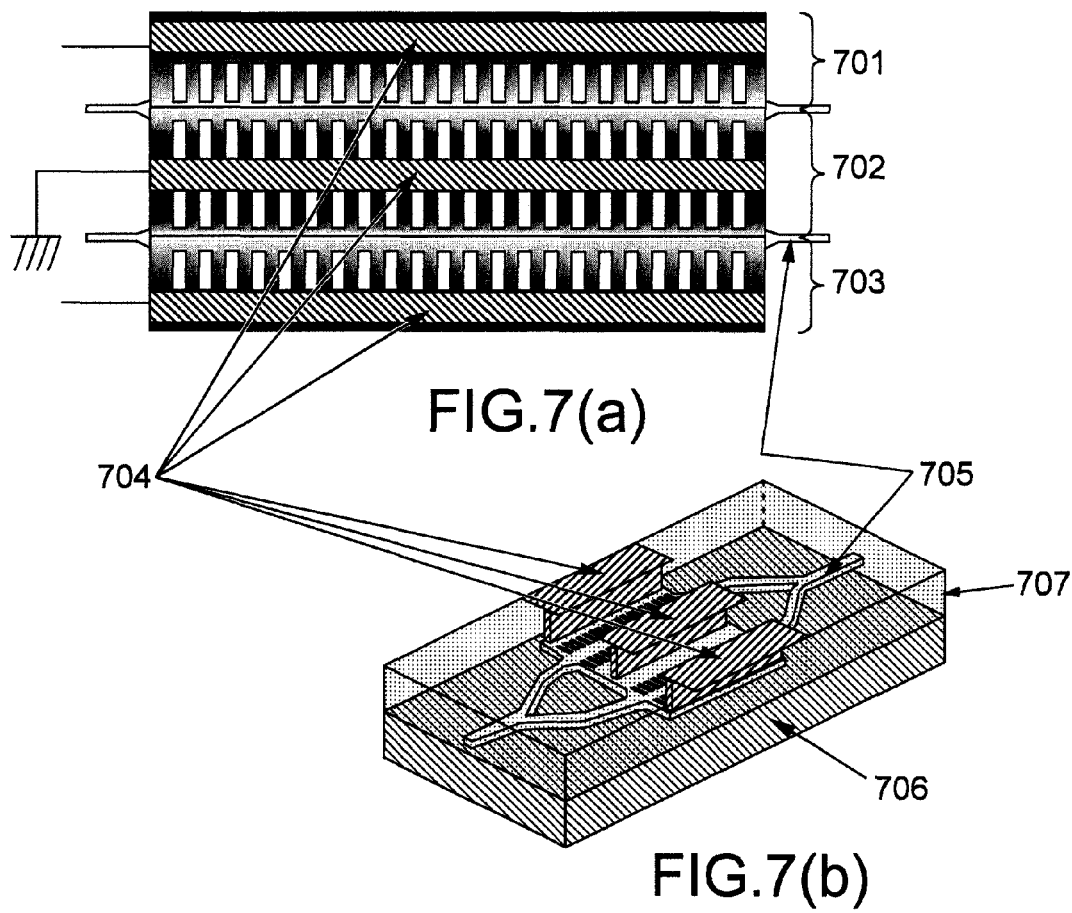
FIG. 7(a) is an expanded top plan view of the branch portion of Mach-Zehnder interferometer optical switch (optical modulator) using the optical waveguide of the present invention.
FIG. 7(b) is a perspective view of the Mach-Zehnder interferometer optical switch using the optical waveguide of the present invention.

Various optical waveguide devices whose characteristics are electrically controllable can be realized by using the optical waveguide structure described in the above examples. FIG. 7 illustrates a Mach-Zehnder interferometer optical switch as one example of them. FIG. 7(a) is an expanded top plan view of the branch portion thereof. FIG. 7(b) is a schematic perspective view of the Mach-Zehnder interferometer optical switch. In the optical switch, Si wire waveguide cores 705 are formed on two branches of the Mach-Zehnder interferometer respectively and external regions are formed on both sides thereof through the bridges. The waveguide core is surrounded by lower clad 706 and upper clad 707. As illustrated in FIG. 7(a), a pn junction is formed at the portion of the waveguide core of each branch and a current is caused to flow to the waveguide core of each branch from electrodes 704 provided on the external regions to control the refractive index of the waveguide core of each branch by a carrier plasma effect, thereby realizing optical switching. In this element, the external regions are separated into three portions. Impurities are doped into each portion to form the p-type or the n-type region. In the structure illustrated in the FIG., the region sandwiched between two branches of the Mach-Zehnder interferometer is formed of n-type semiconductor 702 and both regions outside the two branches of the Mach-Zehnder interferometer are formed of p-type semiconductors 701 and 703. The p-type and the n-type regions may be reversed. Therefore, in this switch, a common electrode is formed in the external region formed of n-type semiconductor 702 being the region sandwiched between the two branches of the Mach-Zehnder interferometer and voltages whose polarities are reverse to each other (positive and negative) are applied to the electrodes formed in the external regions formed of p-type semiconductors 701 and 703, which injects carriers into the core of one of the braches (the refractive index is reduced by the carrier plasma effect) and extracts carriers from the core of the other of the braches (the refractive index is elevated by the carrier plasma effect), thereby causing the switch to perform a push-pull operation. This therefore enables the switch to perform a switching operation at a voltage being about one half as low as a voltage at which the switch is not caused to perform a push-pull operation.

The invention claimed is:

1. An optical waveguide comprising:
a waveguide core;
a clad covering the waveguide core, the clad being made of an insulating material;
two external regions in the vicinity of the waveguide core; and
a bridge structure connecting the two external regions to the waveguide core,
wherein the waveguide core is formed of a part of a semiconductor layer, the semiconductor layer comprising at least:
  a first impurity concentration region that forms the waveguide core; and
  second impurity concentration regions having higher impurity concentration than the first impurity concentration region, the second impurity concentration regions being disposed on both sides of the first impurity concentration region,
wherein the bridge structure is provided by forming multiple holes to the second impurity concentration regions in the semiconductor layer, the multiple holes being arranged respectively into a row along a longitudinal direction of the waveguide on both sides of the first impurity concentration region,
wherein first ends of the multiple holes are located at a boundary of the first and second impurity concentration regions,
wherein the two external regions enable injecting a current into the waveguide core through the bridge structure, and
wherein the waveguide core is optically separated from the two external regions by the multiple holes.

2. The optical waveguide according to claim 1, wherein the semiconductor layer is doped with different conductive types of impurities so as to form a pn junction inside or around the first impurity concentration region.

3. The optical waveguide according to claim 1, wherein the multiple holes are each formed in a slit shape.

4. The optical waveguide according to claim 3, wherein the multiple holes are periodically arranged on both sides of the first impurity concentration region.

5. The optical waveguide according to claim 3, wherein the multiple holes are periodically arranged so that a phase of a periodical arrangement of the multiple holes is shifted by $\pi$ on both sides of the first impurity concentration region.

6. The optical waveguide according to claim 1, wherein the semiconductor layer further comprises third impurity concentration regions having higher impurity concentration than the second impurity concentration regions, the third impurity concentration regions being provided on both outer sides of the second impurity concentration regions and forming the two external regions.

7. The optical waveguide according to claim 6, wherein electrodes are connected to the respective external regions and apply a voltage thereto, injecting a current into the first impurity concentration region that forms the waveguide core, thereby enabling the characteristics of the waveguide to be electrically controlled.

* * * * *

UNITED STATES PATENT AND TRADEMARK OFFICE
CERTIFICATE OF CORRECTION

PATENT NO. : 8,374,469 B2  Page 1 of 1
APPLICATION NO. : 12/278907
DATED : February 12, 2013
INVENTOR(S) : Yamada It is certified that error appears in the above-identified patent and that said Letters Patent is hereby corrected as shown below:

In the Specification

Column 7, Line 33: Delete "it" and insert -- $\pi$ --

Signed and Sealed this
Twenty-first Day of October, 2014

Michelle K. Lee
*Deputy Director of the United States Patent and Trademark Office*